(12) United States Patent
Faibish et al.

(10) Patent No.: US 9,639,555 B1
(45) Date of Patent: May 2, 2017

(54) OBJECT STORAGE SERVER BASED GATEWAY TO NETWORK FILE SYSTEM CLUSTER

(71) Applicant: EMC Corporation, Hopkinton, MA (US)

(72) Inventors: Sorin Faibish, Newton, MA (US); John M. Bent, Los Alamos, NM (US); Uday Gupta, Westford, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 13/924,348

(22) Filed: Jun. 21, 2013

(51) Int. Cl.
*G06F 17/30* (2006.01)

(52) U.S. Cl.
CPC ................ *G06F 17/30203* (2013.01)

(58) Field of Classification Search
CPC ......... G06F 17/30091; G06F 17/30067; G06F 17/30082; G06F 17/30224; G06F 17/30598; G06F 17/30115; G06F 17/30129; G06F 17/30203; G06F 17/30194; G06F 17/30135; G06F 17/30575

See application file for complete search history.

(56) References Cited

U.S. PATENT DOCUMENTS

| | | | |
|---|---|---|---|
| 6,910,074 B1 * | 6/2005 | Amin et al. | 709/227 |
| 8,862,645 B1 * | 10/2014 | Ma | G06F 17/30091 707/827 |
| 9,043,567 B1 * | 5/2015 | Modukuri | G06F 3/0665 711/162 |
| 9,286,261 B1 * | 3/2016 | Tzelnic | G06F 15/167 |
| 9,558,208 B1 * | 1/2017 | Faibish | G06F 17/30233 |
| 2002/0161855 A1 * | 10/2002 | Manczak et al. | 709/219 |
| 2006/0090163 A1 * | 4/2006 | Karisson et al. | 718/105 |

(Continued)

OTHER PUBLICATIONS

EMC Corporation, "EMC Isilon Scale-Out Storage Product Family—Storage Made Simple," 2012, 6 pages.

(Continued)

*Primary Examiner* — Ashish K Thomas
*Assistant Examiner* — Rezwanul Mahmood
(74) *Attorney, Agent, or Firm* — Ryan, Mason & Lewis, LLP

(57) ABSTRACT

A gateway of a cluster file system comprises a plurality of object storage servers each having one or more object storage targets implemented using storage devices of a first type. The gateway is configured to communicate with a network file system cluster implemented using storage devices of a second type different than the first type. The network file system cluster comprises storage directories corresponding to respective ones of the object storage targets. A controller that may be implemented at least in part within the gateway is configured to control movement of data between the object storage targets and the storage directories of the network file system cluster. The movement of data between the object storage targets and the storage directories may be controlled at least in part based on one or more of policy information provided by a policy engine and information provided by an application running on a client.

20 Claims, 4 Drawing Sheets

(56) References Cited

U.S. PATENT DOCUMENTS

2011/0313973 A1* 12/2011 Srivas ............... G06F 17/30194
  707/634
2012/0173656 A1* 7/2012 Sorenson, III ................ 709/217

OTHER PUBLICATIONS

Cluster File Systems, Inc., "Lustre: A Scalable, High-Performance File System," Nov. 2002, 13 pages.
Feiyi Wang et al., "Understanding Lustre Filesystem Internals," Tech Report: ORNL/TM-2009/117, Apr. 2010, 95 pages.
J. Bent et al., "PLFS: A Checkpoint Filesystem for Parallel Applications," ACM/IEEE Conference on High Performance Computing, Networking, Storage and Analysis, SC09, Nov. 2009, 12 pages.

* cited by examiner

OBJECT STORAGE SERVER BASED GATEWAY TO NETWORK FILE SYSTEM CLUSTER

FIELD

The field relates generally to data storage, and more particularly to parallel file systems and other types of cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

For example, certain types of highly cost effective storage, such as scale-out network attached storage, are often seen as failing to provide performance characteristics that are adequate for use with supercomputers and other complex computing environments that utilize Lustre file systems.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that implement an object storage server based gateway to a network file system cluster. Such arrangements provide significant advantages relative to conventional arrangements. For example, the illustrative embodiments allow cluster file systems to more easily scale to meet desired levels of performance, particularly in supercomputers and other complex computing environments.

In one embodiment, a gateway of a cluster file system comprises a plurality of object storage servers each having one or more object storage targets implemented using storage devices of a first type. The gateway is configured to communicate with a network file system cluster coupled to the gateway and implemented using storage devices of a second type different than the first type. The network file system cluster comprises storage directories corresponding to respective ones of the object storage targets. The network file system cluster may be implemented, for example, using scale-out network attached storage.

A controller that may be implemented at least in part within the gateway is configured to control movement of data between the object storage targets and the storage directories of the network file system cluster.

The movement of data between the object storage targets and the storage directories may be controlled at least in part based on one or more of policy information provided by a policy engine and information provided by an application running on a client.

As noted above, illustrative embodiments described herein provide significant improvements relative to conventional arrangements. In some of these embodiments, an object storage server based gateway operates in conjunction with an underlying network file system cluster to provide dynamic balancing of storage capacity and IO throughput requirements in a cluster file system, thereby allowing particular levels of performance to be achieved at a significantly lower cost than would otherwise be possible. Similar advantages are achieved in other embodiments.

DETAILED DESCRIPTION

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices, as well as combinations of multiple such file systems.

Figure 1:
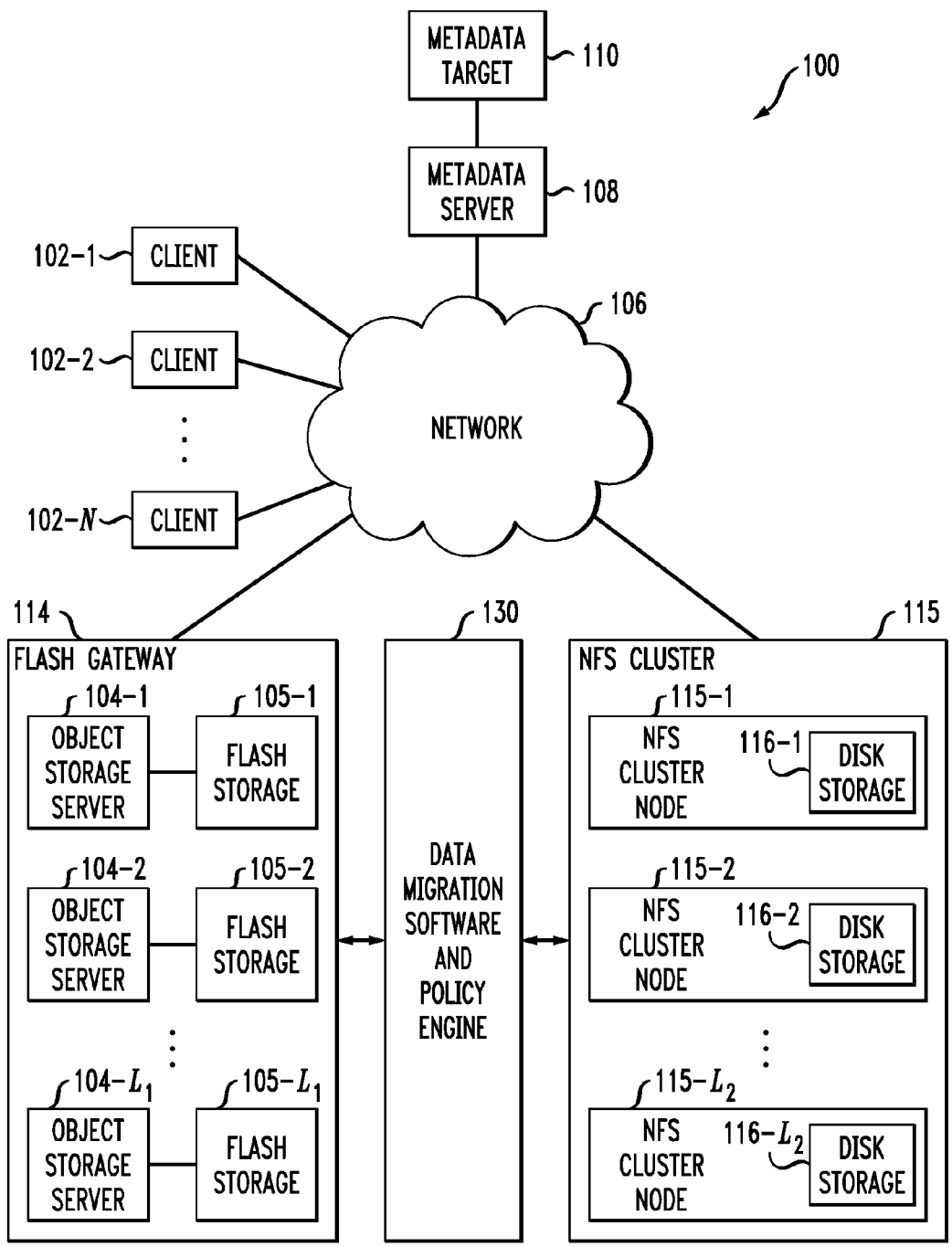
FIG. 1 is a block diagram of a cluster file system having an object storage server based gateway to a network file system cluster in an illustrative embodiment of the invention.

FIG. 1 shows a cluster file system 100 configured in accordance with an illustrative embodiment of the present invention. The cluster file system 100 comprises a plurality of clients 102-1, 102-2, . . . 102-N and a plurality of object storage servers 104-1, 104-2, . . . 104-$L_1$. The object storage servers are coupled to respective object storage targets 105-1, 105-2, . . . 105-$L_1$ each comprising a set of one or more flash storage devices. The object storage servers 104 and their associated object storage targets 105 are implemented in a flash gateway 114 of the cluster file system 100. In other embodiments, each of the object storage servers 104 may be associated with multiple object storage targets. The flash storage devices utilized to implement the object storage targets 105 of the flash gateway 114 are examples of what are more generally referred to herein as storage devices of a first type.

In the context of the FIG. 1 embodiment, reference numeral 105 will be used to indicate both flash storage devices in particular and object storage targets in general, and it should be understood that the more general term "object storage target" may comprise one or more flash devices or other types of storage devices, such as other types of non-volatile memory, in any combination.

The clients 102 and the object storage servers 104 communicate with one another over a network 106. Also coupled to the network 106 is a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its associated metadata target 110 in processing the metadata requests received from the clients 102. The metadata target 110 may comprise a storage array or other type of storage device. For example, the metadata target 110 may be implemented at least in part using a flash storage device.

The flash gateway 114 is configured to communicate with a network file system cluster 115 that is implemented using disk storage devices 116. The network file system cluster 115 in this embodiment is more particularly referred to as an NFS cluster having a plurality of nodes 115-1, 115-2, ... 115-$L_2$ comprising respective sets of one or more disk storage devices 116-1, 116-2, ... 116-$L_2$. The disk storage devices 116 are examples of what are more generally referred to herein as storage devices of a second type.

By way of example, the NFS cluster 115 may be implemented using one or more scale-out network attached storage clusters, also referred to herein as scale-out NAS clusters. Such scale-out NAS clusters may comprise, for example, Isilon storage platforms, such as storage platforms comprising Isilon platform nodes and associated accelerators in the S-Series, X-Series and NL-Series product lines, commercially available from EMC Corporation of Hopkinton, Mass.

It should be noted that other storage device types may be used in other embodiments. Accordingly, other embodiments may comprise different gateways that comprise object storage targets implemented using storage devices of a first type and that are configured to communicate with a network file system cluster implemented using storage devices of a second type different than the first type. Also, the term "network file system" as used herein is intended to be broadly construed, and should not be viewed as being limited to any particular protocol, such as the NFS protocol. Instead, the term as generally used herein is intended to encompass other types of distributed or parallel file systems.

As will be described in greater detail below in conjunction with the illustrative embodiments of FIGS. 2 and 3, the NFS cluster 115 comprises a plurality of storage directories corresponding to respective ones of the object storage targets 105 and the metadata target 110. Thus, for example, there may be a one-to-one correspondence between storage directories of the NFS cluster 115 and the object storage and metadata targets.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The flash gateway 114 comprising object storage servers 104 and associated object storage targets 105 in the present embodiment may be viewed as forming at least a portion of a first storage tier of the cluster file system 100. Also, the nodes of the NFS cluster 115 may be viewed as forming at least a portion of a second storage tier of the cluster file system 100. Accordingly, the cluster file system 100 in the present embodiment is illustratively configured to provide a first storage tier comprising an object storage server or OSS storage tier and a second storage tier comprising an NFS cluster storage tier. Other storage tiering arrangements may be used in other embodiments. For example, although there are two storage tiers in this embodiment, it is to be appreciated that more than two storage tiers may be used in other embodiments.

The cluster file system 100 is configured to control movement of data between the first and second storage tiers corresponding to the respective flash gateway 114 and NFS cluster 115. In the present embodiment, this data movement between storage tiers is accomplished at least in part utilizing data migration software and policy engine module 130 that is configured to control migration of data between the first and second storage tiers. The term "data movement" as used herein is intended to be broadly construed, so as to encompass data migration as well as other types of movement of data between storage tiers. For example, the term "data movement" as used herein may also encompass a variety of different types of movement associated with hierarchical storage management (HSM).

Although illustratively shown as being separate from the flash gateway 114 and NFS cluster 115 in the figure, components of the module 130 are assumed to be implemented in the object storage servers 104 as well as in the nodes of the NFS cluster 115. The module 130 may comprise middleware that resides between operating system software and application software on one or more processing devices. The module 130 is one example of what is more generally referred to herein as a "controller." A given controller as the term is broadly used herein can be implemented using hardware, software or firmware, as well as various combinations of such elements. As indicated above, a controller may be implemented at least in part within a gateway such as flash gateway 114 in FIG. 1.

The different storage tiers in this embodiment comprise different types of storage devices having different performance characteristics. As mentioned previously, each of the object storage servers 104 is configured to interface with a corresponding object storage target 105 comprising one or more flash storage devices, and each of the nodes of the NFS cluster 115 comprises one or more disk storage devices.

The flash storage devices 105 of the first storage tier are generally significantly faster in terms of read and write access times than the disk storage devices 116 of the second storage tier. The flash storage devices are therefore considered "fast" devices in this embodiment relative to the "slow" disk storage devices. Accordingly, the cluster file system 100 may be characterized in the present embodiment as having a "fast" storage tier provided by the flash gateway 114 and a "slow" storage tier provided by the NFS cluster 115, where "fast" and "slow" in this context are relative terms and not intended to denote any particular absolute performance level. However, numerous alternative tiering arrangements may be used, including arrangements with three or more tiers each providing a different level of performance. The particular storage devices used in a given storage tier may be varied in other embodiments, and multiple distinct storage device types may be used within a single storage tier.

The flash storage devices 105 may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used in place of the flash storage devices. Examples of alternatives to flash storage devices that may be used as respective object storage targets in other embodiments of the invention include non-volatile memories such as magnetic random access memory (MRAM) and phase change random access memory (PC-RAM).

The flash storage devices 105 of the first storage tier generally provide higher performance than the disk storage devices 116 of the second storage tier but the disk storage devices 116 generally provide higher capacity at lower cost than the flash storage devices 105. The exemplary tiering arrangement of FIG. 1 therefore makes it possible to dynamically balance the conflicting requirements of storage capacity and JO throughput, thereby avoiding situations in which either performance is less than optimal or the costs of implementing the system become excessive. Arrangements of this type can provide further acceleration of JO operations in the cluster file system 100, leading to enhanced system performance relative to conventional arrangements, while additionally or alternatively providing an ability to achieve particular levels of performance at lower cost.

System elements such as clients 102, object storage servers 104, metadata server 108 and NFS cluster nodes 115 may be implemented as respective processing devices each comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "computer program products" storing executable computer program code.

A processing device of the type described above will also generally include network interface circuitry. The network interface circuitry allows the processing device to communicate over the network 106 with other processing devices used to implement other system elements. The network interface circuitry may comprise, for example, one or more conventional transceivers.

The module 130 may be implemented in the form of software that is stored in one or more memories and executed by one or more processors within one or more processing devices. As indicated previously, the module 130 may comprise middleware that resides between operating system software and application software on the processing devices.

It should be understood that the particular arrangement of system elements illustrated in FIG. 1 is presented by way of example only, and numerous other arrangements are possible. For example, although only a single metadata server 108 is shown in the FIG. 1 embodiment, a given cluster file system in other embodiments may comprise multiple metadata servers, each having one or more metadata targets.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system. Examples of Lustre file systems configured in accordance with embodiments of the invention will be described below with reference to FIGS. 2 and 3.

Figure 2:
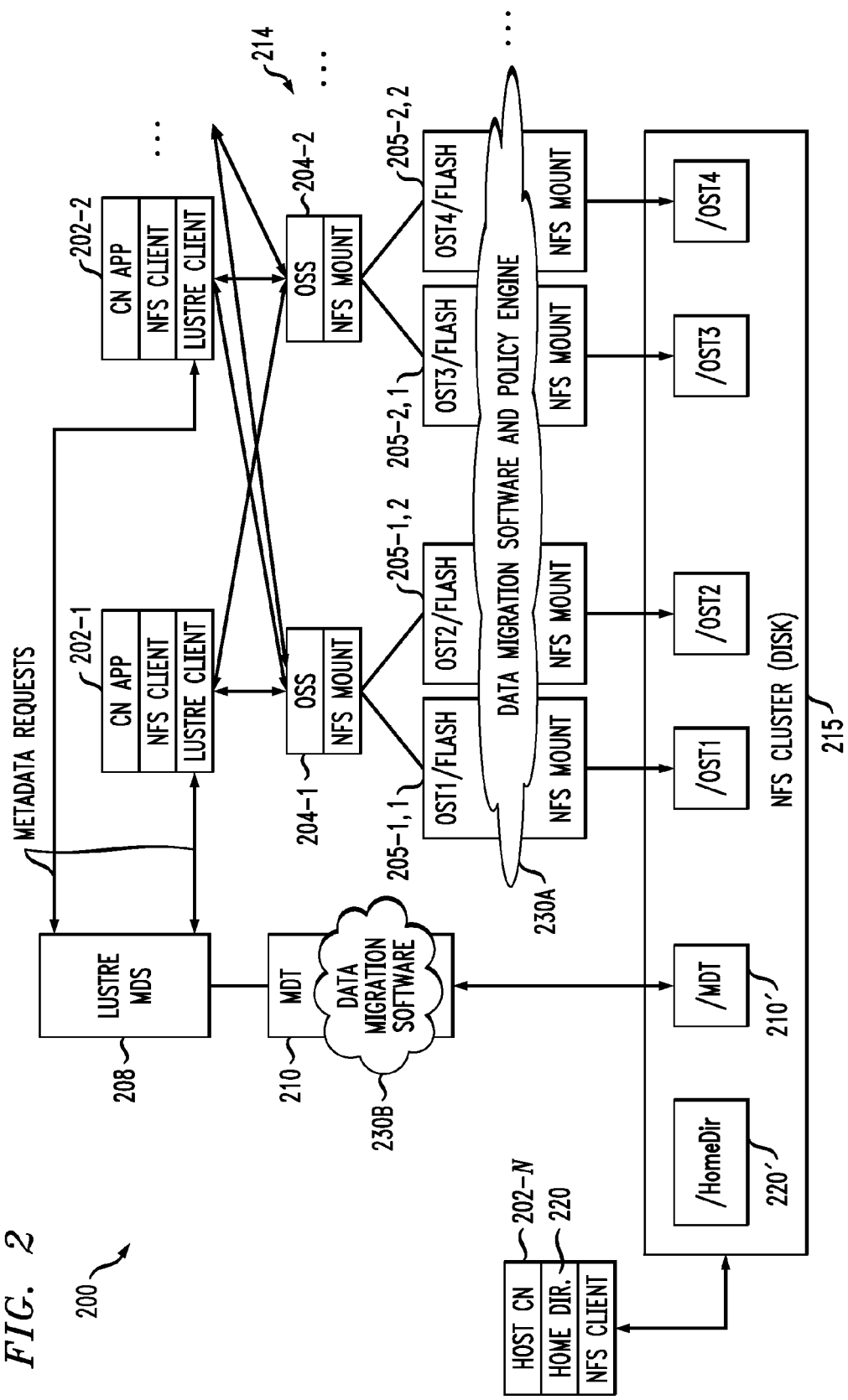
FIGS. 2 and 3 are block diagrams of other illustrative embodiments of cluster file systems each having an object storage server based gateway to a network file system cluster.

As illustrated in FIG. 2, a cluster file system 200 in an embodiment of the invention comprises a plurality of clients 202-1, 202-2, ... 202-N, a plurality of object storage servers 204, a plurality of object storage targets 205, a metadata server 208, a metadata target 210, and an NFS cluster 215. The clients 202 are more particularly referred to as compute nodes (CNs) in this embodiment. The object storage servers 204, object storage targets 205, metadata server 208 and metadata target 210 are also denoted in this figure as Lustre OSS, OST, MDS and MDT elements, respectively.

Each of the OSSs 204 exposes multiple OSTs 205 in the present embodiment. Each of the OSTs 205 is assumed to comprise one or more flash storage devices, although other types of storage devices could be used in other embodiments. A flash gateway 214 comprises the OSSs 204 and associated OSTs 205 of the cluster file system 200. The flash gateway 214 more particularly includes OSS 204-1 coupled to OSTs 205-1,1 and 205-1,2 and OSS 204-2 coupled to OSTs 205-2,1 and 205-2,2. The OSTs 205 are also denoted as OST1, OST2, OST3 and OST4 in the figure. Different numbers and arrangements of OSSs and OSTs may be used in other embodiments.

The NFS cluster 215 comprises storage directories corresponding to respective ones of the OSTs 205 and the MDT 210. More particularly, the NFS cluster 215 comprises first, second, third and fourth storage directories respectively denoted /OST1, /OST2, /OST3 and /OST4 and corresponding to the respective OSTs 205 denoted OST1, OST2, OST3 and OST4 in the flash gateway 214. The NFS cluster further comprises an additional storage directory 210' denoted /MDT and corresponding to the MDT 210.

A given such storage directory of the NFS cluster 215 in the present embodiment is assumed to comprise a replica of substantially the entire contents of the corresponding OST or MDT, so as to facilitate processing of Lustre data files, although other storage directory arrangements could be used in other embodiments.

The CNs 202 can access the flash gateway 214 using data IO requests directed to the OSSs 204 based on metadata obtained from the MDS 208. The IO requests and other similar requests herein may be configured, for example, in accordance with standard portable operating system interface (POSIX) system calls.

The MDS 208 utilizes the MDT 210 to provide metadata services for the cluster file system 200. The MDT 210 stores file metadata, such as file names, directory structures, and access permissions.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by configuring the system 200 to include flash gateway 214 and NFS cluster 215. As noted above, these elements may be viewed as providing respective first and second storage tiers in FIG. 2. The cluster file system 200 further comprises data migration software 230 configured to control movement of data between the tiers.

The data migration software 230 in this embodiment comprises a first portion 230A that controls movement of data between the OSTs 205 of the flash gateway 214 and the corresponding storage directories /OST1, /OST2, /OST3 and /OST4 of the NFS cluster 215, and a second portion 230B that controls movement of data between the MDT 210 and the corresponding storage directory /MDT of the NFS cluster 215. The first portion 230A of the data migration software also comprises a policy engine that is used to control data movement based on one or more policies.

Although shown for simplicity and clarity of illustration as separate portions 230A and 230B associated with the OSTs 205 and MDT 210, the data migration software 230 is assumed to be implemented on one or more processing devices of the cluster file system 200. For example, the first portion 230A may be implemented at least in part within the OSSs 204 and the nodes of the NFS cluster 215, and the second portion 230B may be implemented at least in part within the MDS 208. Portions of the data migration software 230 or its associated policy engine may additionally or alternatively be implemented in other system elements, and are considered examples of what is more generally referred to herein as a "controller." The data migration software 230 may comprise middleware that resides between operating system software and application software on one or more processing devices of the system 200, although other types and combinations of software may be used.

As in the FIG. 1 embodiment, it is assumed that the OSTs 205 of the first storage tier provided by flash gateway 214 are "fast" relative to the "slow" disk storage devices of the second storage tier provided by the NFS cluster 215.

Each of the CNs 202-1 and 202-2 of system 200 more particularly comprises a CN application, an NFS client and a Lustre client as illustrated. The NFS clients of the CNs 202-1 and 202-2 interface with respective NFS mount components of the respective OSSs 204-1 and 204-2.

The NFS mount components of the OSSs 204-1 and 204-2 may be triggered by operations associated with applications running on the CNs 202. These operations may include read or write operations, as well as other types of operations.

The OSTs 205 are also shown as comprising respective NFS mount components. At least a subset of these NFS mount components may be considered part of the data migration software 230.

After a given data file has been migrated from one of the tiers to the other, it may be deleted from the former tier as appropriate based on application need and other policies implemented in the system, although this particular functionality is not explicitly illustrated in the figure. Movement of the given file between the first and second storage tiers may be controlled at least in part based on information provided by one or more of the CN applications running on the CNs 202.

Data files migrated from the first storage tier to the second storage tier are directly accessible within the second storage tier by the CNs 202 of the system 200 without requiring interaction between a given accessing CN and any of the OSSs 204 of the first storage tier. This advantageous feature of direct access to the migrated files is illustrated for CN 202-N in FIG. 2. For example, a home directory client implemented within CN 202-N can directly access one or more data files in the NFS cluster 215.

In this embodiment, the NFS cluster 215 implements an additional storage directory denoted /HomeDir that is directly accessible by client 202-N without requiring interaction between that client and the flash gateway 214. The CN 202-N in this embodiment is designated as a host CN that includes an NFS client and a home directory 220. The storage directory /HomeDir on the NFS cluster 215 is denoted by reference numeral 220' and is assumed to comprise a replica of substantially the entire contents of the corresponding home directory 220 of the host client 202-N.

It is therefore apparent that the direct access feature described above can be used to facilitate implementation of home directories for the CNs 202 in the NFS cluster 215. Also, implementation of functionality such as archiving, backups, security and other types of data protection for the CNs is facilitated by providing the CNs 202 with direct access to files within the nodes of the NFS cluster 215. The CNs 202 can determine whether to access files in flash storage via the OSSs 204 or directly on the NFS cluster 215 based on the particular needs of the applications that are utilizing those files.

Thus, a given CN can select between multiple options for accessing data files and other stored objects within the cluster file system 200, including at least a first option in which the objects are accessed via the OSSs 204 of the flash gateway 214, and a second option in which the objects are accessed directly on the NFS cluster 215 via the NFS client of the CN such that the flash gateway is bypassed. The NFS cluster 215 may therefore be viewed as being modified to support object server functionality.

In the FIG. 2 embodiment, the OSSs 204 utilize flash storage devices 205 to support high performance IO operations. The NFS cluster 215 may be viewed as providing a back-end "shadow" file system that stores migratable data files for processing by the OSSs while also supporting direct file access and the above-noted home directory and data protection functions for the CNs 202.

The NFS components of the OSSs 204 can initiate migration of data files to and from the NFS cluster 215 responsive to information received from the CN applications via the corresponding NFS clients implemented on the CNs 202. For example, a given application running on one of the CNs 202 may provide an indication of a particular type of specialized processing for a certain job, such as "fast" or "slow" processing associated with the respective first or second storage tiers. Such information may be utilized by the data migration software 230 to generate migration requests directing movement of corresponding data between the storage tiers.

In other situations, such as when there is no application information indicating a particular type of specialized processing for a certain job, a policy engine that is part of the data migration software 230 of the system 200 may determine appropriate tiers to be used for the corresponding data. The resulting policy decision is utilized to generate a migration request. For example, the policy engine may implement a policy that specifies that files having a certain request rate will be kept in the flash storage tier even in the absence of any particular application information.

Like the FIG. 1 embodiment, the exemplary tiering arrangement of FIG. 2 makes it possible to dynamically balance the conflicting requirements of storage capacity and IO throughput, thereby avoiding situations in which either performance is less than optimal or the costs of implementing the system become excessive.

Also, such an arrangement allows the cluster file system 200 to obtain the performance advantages of a flash storage tier as well as the storage capacity and cost benefits associated with use of scale-out network attached storage. Accordingly, implementation of scale-out network attached storage is facilitated in supercomputers and other complex computing environments that utilize Lustre file systems.

Figure 3:
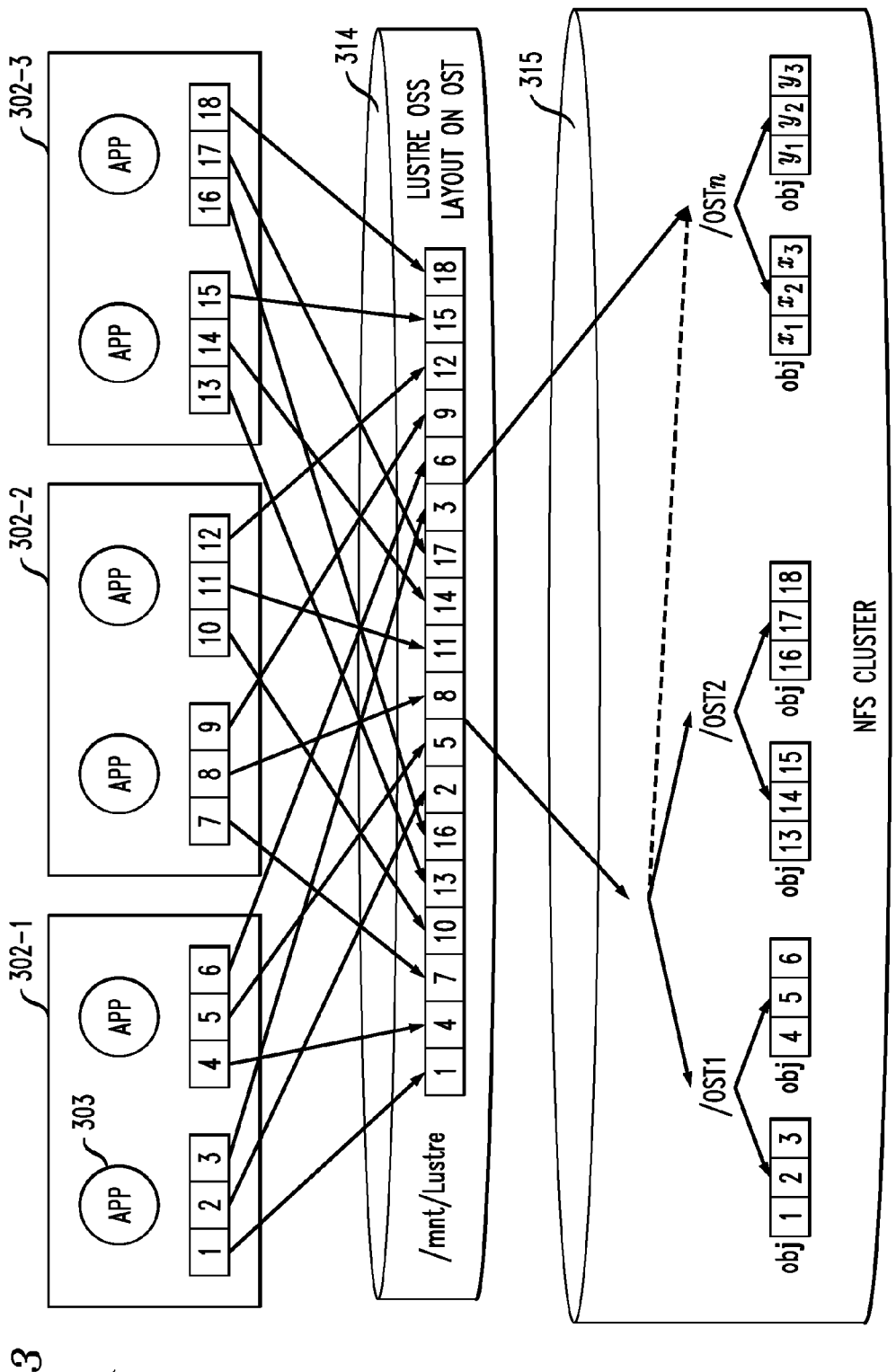

FIG. 3 shows another cluster file system 300 that includes CNs 302-1, 302-2 and 302-3 each including multiple applications 303. The cluster file system 300 comprises an OSS storage tier 314 and an NFS storage tier 315. The OSS storage tier 314 is assumed to implement a flash gateway of the type previously described. The particular numbers of CNs 302 and storage tiers are exemplary only and in other embodiments different numbers and arrangements of such elements may be used.

In the FIG. 3 embodiment, as in other embodiments described herein, the OSS storage tier is also referred to as a "fast" storage tier and the NFS cluster storage tier is also referred to as a "slow" storage tier. Again, the terms "fast" and "slow" in this context are relative terms and should not be construed as requiring any particular absolute performance levels.

The applications 303 on the first CN 302-1 utilize respective sets of data items 1, 2, 3 and 4, 5, 6. Similarly, the applications 303 on the second CN 302-2 utilize respective sets of data items 7, 8, 9 and 10, 11, 12 and the applications 303 on the third CN 302-3 utilize respective sets of data items 13, 14, 15 and 16, 17, 18. Each of the sets of data items is assumed to collectively comprise a corresponding data file. As illustrated in the figure, these data files are collectively stored in accordance with a particular file layout on the OSTs that are associated with the OSSs of the OSS storage tier 314. The set of data files in this example is mounted under a file directory denoted /mnt/Lustre.

Different portions of the set of data files are also stored in different storage directories on the NFS cluster 315. More particularly, the NFS cluster 315 as shown comprises n storage directories denoted /OST1, /OST2, . . . /OSTn, each corresponding to one of n OSTs of the OSS storage tier 314.

Data files comprising respective sets of data items 1, 2, 3 and 4, 5, 6 are stored in the directory /OST1 of the NFS cluster 315, and data files comprising respective sets of data items 13, 14, 15 and 16, 17, 18 are stored in the directory /OST2 of the NFS cluster 315. The remaining data files comprising sets of data items 10, 11, 12 and 7, 8, 9 may be stored in other directories. For example, data files comprising respective sets of data items $x_1$, $x_2$, $x_3$ and $y_1$, $y_2$, $y_3$ are stored in the directory /OSTn of the NFS cluster 315.

The data files in the FIG. 3 embodiment are also referred to herein as objects, and the data items that make up those data files are referred to also referred to herein as sub-objects of objects.

It should be understood that these particular file and storage arrangements are presented by way of illustrative example only, and should not be construed as limiting in any way. Also, the term "storage directory" as used herein is intended to be broadly construed so as to encompass, for example, a high-level directory or one or more subdirectories of such a high-level directory.

Also, alternative embodiments can utilize other types of file systems, including parallel log-structured file system (PLFS). In such an embodiment, the CNs may be configured to include PLFS clients and the OSSs may comprise PLFS components that are used in migration of data files between storage tiers. Data files stored across multiple OSTs can therefore be combined into a single PLFS file for migration.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that use of PLFS is not a requirement, and other types of middleware or data movement control arrangements can be used in other embodiments.

Migration of data between storage tiers in the system of FIG. 3 may be carried out in a manner similar to that previously described in conjunction with FIGS. 1 and 2.

In addition to facilitating dynamic balancing of storage capacity and IO throughput requirements, while reducing implementation costs for particular levels of performance, the illustrative embodiments described above are configured such that additional gateways and NFS clusters can be easily brought online to provide increased amounts of capacity and throughput within a given system. For example, multiple gateways and NFS clusters can serve as basic building blocks or "bricks" for very large cluster file systems in supercomputers and other complex computing environments.

In such arrangements, Lustre performance is no longer limited to the performance of disk storage devices. The flash gateways provide high-performance flash storage devices for Lustre OSSs and OSTs in conjunction with readily scalable NFS clusters on the backend. Thus, the performance advantages of Lustre and scalability advantages of NFS clusters implemented using Isilon storage platforms are obtained in a cluster file system. Embodiments of the invention therefore allow Lustre and Isilon or other types of NFS clusters to be efficiently combined to form a single cluster file system.

It should be noted with regard to the illustrative embodiments of FIGS. 1 through 3 that relatively minor modifications may be made to one or more applications or other system elements or components in order to achieve additional improvements. For example, a job scheduler or other similar component within the system 100, 200 or 300 can also be modified so as to take full advantage of the available storage tiering functionality. Also, some relatively minor modifications may be made to at least a portion of the object storage servers. For example, object storage servers of may be optimized for use with the particular storage device type of their corresponding storage tier.

The exemplary cluster file systems 100, 200 and 300 advantageously obtain the performance advantages of a flash storage tier as well as the storage capacity and cost benefits associated with use of an NFS cluster. These embodiments facilitate implementation of scale-out NAS nodes in supercomputers and other complex computing environments that utilize Lustre file systems.

The cluster file systems 100, 200 and 300 or portions thereof as described in conjunction with FIGS. 1 through 3 may be implemented using one or more processing platforms each comprising a plurality of processing devices. Processing modules or other components of these systems may therefore each run on a computer, storage device or other processing platform element. A given such element may be viewed as an example of what is more generally referred to herein as a "processing device."

Figure 4:
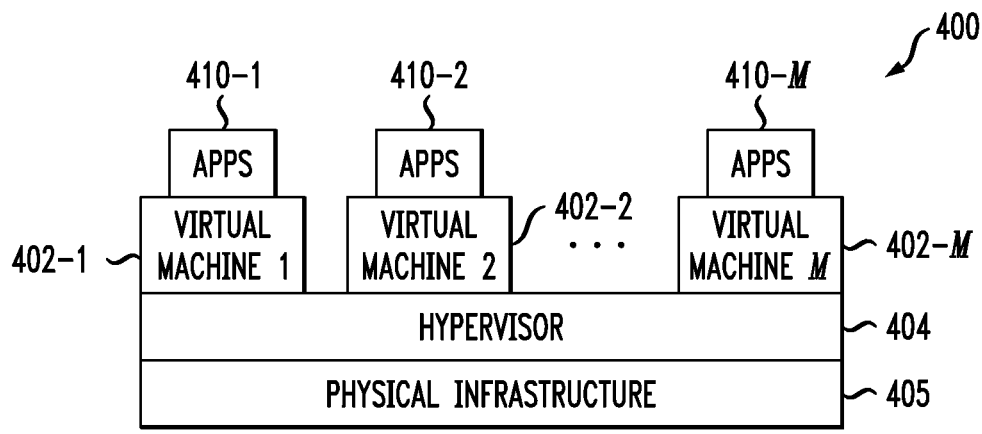
FIGS. 4 and 5 show examples of processing platforms that may be utilized to implement at least a portion of one or more of the cluster file systems of FIGS. 1 through 3.

Referring now to FIG. 4, one possible processing platform that may be used to implement at least a portion of one or more embodiments of the invention comprises cloud infrastructure 400. The cloud infrastructure 400 in this exemplary processing platform comprises virtual machines (VMs) 402-1, 402-2, . . . 402-M implemented using a hypervisor 404. The hypervisor 404 runs on physical infrastructure 405. The cloud infrastructure 400 further comprises sets of applications 410-1, 410-2, . . . 410-M running on respective ones of the virtual machines 402-1, 402-2, . . . 402-M under the control of the hypervisor 404.

The cloud infrastructure 400 may encompass the entire system 100 or only portions of that system, such as one or more of clients 102, object storage servers 104, object storage targets 105, metadata server 108, metadata target 110 and NFS cluster 115. Similar arrangements of cloud infrastructure may be used to implement at least a portion of the systems 200 and 300 of respective FIGS. 2 and 3.

Although only a single hypervisor 404 is shown in the embodiment of FIG. 4, system 100, 200 or 300 may of course include multiple hypervisors each providing a set of virtual machines using at least one underlying physical machine.

An example of a commercially available hypervisor platform that may be used to implement hypervisor 404 and possibly other portions of system 100, 200 or 300 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100, 200 or 300.

Figure 5:
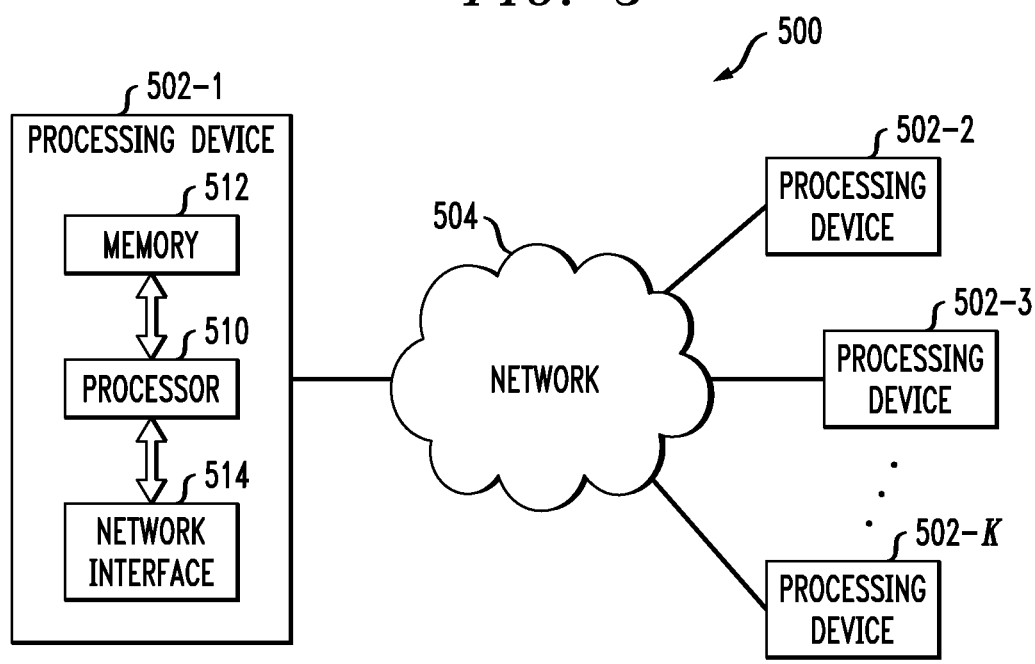

Another example of a processing platform is processing platform 500 shown in FIG. 5. The processing platform 500 in this embodiment comprises at least a portion of one of the systems 100, 200 or 300 and includes a plurality of processing devices, denoted 502-1, 502-2, 502-3, . . . 502-K, which communicate with one another over a network 504. The network 504 may comprise any type of network, such as a WAN, a LAN, a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an ASIC, an FPGA or other type of processing circuitry, as well as portions or combinations of such circuitry elements, and the memory 512, which may be viewed as an example of a "computer program product" having executable computer program code embodied therein, may comprise RAM, ROM or other types of memory, in any combination.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100, 200 or 300 may include additional or alternative processing platforms, as well as numerous distinct processing platforms in any combination, with each such platform comprising one or more computers, storage devices or other processing devices.

Multiple elements of system 100, 200 or 300 may be collectively implemented on a common processing platform of the type shown in FIG. 4 or 5, or each such element may be implemented on a separate processing platform.

As indicated above, cluster file system functionality such as that described in conjunction with FIGS. 1 through 3 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from use of an object storage server gateway to a network file system cluster as described herein. Also, the particular configurations of system and device elements shown in FIGS. 1 through 3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a gateway comprising a plurality of object storage servers each associated with and respectively coupled to one or more object storage targets comprising storage devices of a first type; and
a controller;
wherein the gateway is configured to communicate with a network file system cluster implemented using storage devices of a second type different than the first type;
wherein the network file system cluster comprises storage directories corresponding to respective ones of the object storage targets;
the storage devices of the first type being part of the gateway and separate from the network file system cluster;
each of the object storage targets thereby being implemented within the gateway and storing a plurality of objects with each such object comprising multiple data items of the corresponding one of the storage directories of the network file system cluster;
wherein the storage devices of the first type comprise respective flash storage devices;
wherein the storage directories of the network file system cluster replicate data items of the respective ones of the object storage targets;
wherein the one or more object storage targets are separate from their associated object storage servers;
wherein a data file comprises a set of the data items, and a plurality of data files are collectively stored on the one or more object storage targets under at least one directory distinct from the storage directories of the network file system cluster;

wherein the plurality of data files are allocated from the at least one directory into different groups which are respectively stored in different ones of the storage directories of the network file system cluster;

wherein the gateway and the network file system cluster are configured to support multiple access options for permitting a given client to access one or more of the objects including a first access option in which the one or more objects are accessed via at least one of the object storage servers of the gateway and a second access option in which the given client bypasses the gateway and directly accesses the one or more objects in the network file system cluster;

wherein the network file system cluster further comprises a home directory that is directly accessible by the given client without requiring interaction between the given client and the gateway;

wherein the controller is configured to control movement of data between the object storage targets and the storage directories; and wherein portions of the controller comprise network file system mount components implemented in respective ones of the object storage servers and the object storage targets.

2. The apparatus of claim 1 wherein the gateway is further configured to communicate with a plurality of clients over a network.

3. The apparatus of claim 1 wherein the network file system cluster comprises a scale-out network attached storage cluster.

4. The apparatus of claim 1 wherein the object storage servers and their associated object storage targets form at least a portion of a first storage tier of a cluster file system and the network file system cluster forms at least a portion of a second storage tier of the cluster file system.

5. The apparatus of claim 1 wherein the movement of data between the object storage targets and the storage directories is controlled at least in part based on policy information provided by a policy engine.

6. The apparatus of claim 1 wherein the movement of data between the object storage targets and the storage directories is controlled at least in part based on information provided by an application running on a client.

7. The apparatus of claim 1 wherein the portions of the controller are implemented in the gateway.

8. The apparatus of claim 1 further comprising:
a metadata server; and
a metadata target associated with the metadata server;
wherein the network file system cluster further comprises an additional storage directory corresponding to the metadata target; and
wherein the controller is further configured to control movement of metadata between the metadata target and the additional storage directory of the network file system cluster.

9. The apparatus of claim 1 wherein the storage devices of the second type used to implement the network file system cluster comprise respective disk storage devices.

10. The apparatus of claim 1 wherein the gateway is configured such that the given client accesses a particular one of the objects stored within the object storage targets of the gateway by obtaining metadata from a metadata server external to the gateway, utilizing the metadata to identify a particular one of the object storage servers that is associated with a particular one of the object storage targets that stores the particular object, and directing a request to the identified object storage server.

11. The apparatus of claim 1 wherein in conjunction with migration of an object from the network file system cluster to one of the object storage servers of the gateway the object is deleted from the network file system cluster.

12. The apparatus of claim 1 further comprising:
a metadata server; and
a metadata target associated with the metadata server;
wherein the network file system cluster further comprises an additional storage directory corresponding to the metadata target; and
wherein metadata from the metadata target and the data items of the respective ones of the object storage targets are each stored in their corresponding storage directories in the network file system cluster.

13. A processing platform comprising an apparatus, the apparatus comprising:

a gateway comprising a plurality of object storage servers each associated with and respectively coupled to one or more object storage targets comprising storage devices of a first type; and a controller;

wherein the gateway is configured to communicate with a network file system cluster implemented using storage devices of a second type different than the first type;

wherein the network file system cluster comprises storage directories corresponding to respective ones of the object storage targets;

the storage devices of the first type being part of the gateway and separate from the network file system cluster;

each of the object storage targets thereby being implemented within the gateway and storing a plurality of objects with each such object comprising multiple data items of the corresponding one of the storage directories of the network file system cluster;

wherein the storage devices of the first type comprise respective flash storage devices;

wherein the storage directories of the network file system cluster replicate data items of the respective ones of the object storage targets;

wherein the one or more object storage targets are separate from their associated object storage servers;

wherein a data file comprises a set of the data items, and a plurality of data files are collectively stored on the one or more object storage targets under at least one directory distinct from the storage directories of the network file system cluster;

wherein the plurality of data files are allocated from the at least one directory into different groups which are respectively stored in different ones of the storage directories of the network file system cluster;

wherein the gateway and the network file system cluster are configured to support multiple access options for permitting a given client to access one or more of the objects including a first access option in which the one or more objects are accessed via at least one of the object storage servers of the gateway and a second access option in which the given client bypasses the gateway and directly accesses the one or more objects in the network file system cluster;

wherein the network file system cluster further comprises a home directory that is directly accessible by the given client without requiring interaction between the given client and the gateway;

wherein the controller is configured to control movement of data between the object storage targets and the storage directories; and wherein portions of the controller comprise network file system mount components implemented in respective ones of the object storage servers and the object storage targets.

14. A method comprising:

providing a gateway comprising a plurality of object storage servers each associated with and respectively coupled to one or more object storage targets comprising storage devices of a first type; and configuring the gateway for communication with a network file system cluster implemented using storage devices of a second type different than the first type;

wherein the network file system cluster comprises storage directories corresponding to respective ones of the object storage targets;

the storage devices of the first type being part of the gateway and separate from the network file system cluster;

each of the object storage targets thereby being implemented within the gateway and storing a plurality of objects with each such object comprising multiple data items of the corresponding one of the storage directories of the network file system cluster;

wherein the storage devices of the first type comprise respective flash storage devices;

wherein the storage directories of the network file system cluster replicate data items of the respective ones of the object storage targets;

wherein the one or more object storage targets are separate from their associated object storage servers;

wherein a data file comprises a set of the data items, and a plurality of data files are collectively stored on the one or more object storage targets under at least one directory distinct from the storage directories of the network file system cluster;

wherein the plurality of data files are allocated from the at least one directory into different groups which are respectively stored in different ones of the storage directories of the network file system cluster;

wherein the gateway and the network file system cluster are configured to support multiple access options for permitting a given client to access one or more of the objects including a first access option in which the one or more objects are accessed via at least one of the object storage servers of the gateway and a second access option in which the given client bypasses the gateway and directly accesses the one or more objects in the network file system cluster;

wherein the network file system cluster further comprises a home directory that is directly accessible by the given client without requiring interaction between the given client and the gateway;

wherein a controller is configured to control movement of data between the object storage targets and the storage directories; and wherein portions of the controller comprise network file system mount components implemented in respective ones of the object storage servers and the object storage targets.

15. The method of claim 14 further comprising:

controlling the movement of the data between the object storage targets and the storage directories at least in part based on one or more of:

policy information provided by a policy engine; and information provided by an application running on a client.

16. A computer program product comprising a non-transitory processor-readable storage medium having encoded therein executable code of one or more software programs, wherein the one or more software programs when executed on one or more processing platforms cause the one or more processing platforms to:

provide a gateway comprising a plurality of object storage servers each associated with and respectively coupled to one or more object storage targets comprising storage devices of a first type; and configure the gateway for communication with a network file system cluster implemented using storage devices of a second type different than the first type;

wherein the network file system cluster comprises storage directories corresponding to respective ones of the object storage targets;

the storage devices of the first type being part of the gateway and separate from the network file system cluster;

each of the object storage targets thereby being implemented within the gateway and storing a plurality of objects with each such object comprising multiple data items of the corresponding one of the storage directories of the network file system cluster;

wherein the storage devices of the first type comprise respective flash storage devices;

wherein the storage directories of the network file system cluster replicate data items of the respective ones of the object storage targets;

wherein the one or more object storage targets are separate from their associated object storage servers;

wherein a data file comprises a set of the data items, and a plurality of data files are collectively stored on the one or more object storage targets under at least one directory distinct from the storage directories of the network file system cluster;

wherein the plurality of data files are allocated from the at least one directory into different groups which are respectively stored in different ones of the storage directories of the network file system cluster;

wherein the gateway and the network file system cluster are configured to support multiple access options for permitting a given client to access one or more of the objects including a first access option in which the one or more objects are accessed via at least one of the object storage servers of the gateway and a second access option in which the given client bypasses the gateway and directly accesses the one or more objects in the network file system cluster;

wherein the network file system cluster further comprises a home directory that is directly accessible by the given client without requiring interaction between the given client and the gateway;

wherein a controller is configured to control movement of data between the object storage targets and the storage directories; and wherein portions of the controller comprise network file system mount components implemented in respective ones of the object storage servers and the object storage targets.

17. A cluster file system comprising:

a gateway comprising a plurality of object storage servers each having and being respectively coupled to one or more object storage targets comprising storage devices of a first type;

a network file system cluster coupled to the gateway and implemented using storage devices of a second type different than the first type; and a controller;

wherein the network file system cluster comprises storage directories corresponding to respective ones of the object storage targets; and wherein the controller is configured to control movement of data between the object storage targets and the storage directories of the network file system cluster;

wherein portions of the controller comprise network file system mount components implemented in respective ones of the object storage servers and the object storage targets;

the storage devices of the first type being part of the gateway and separate from the network file system cluster;

each of the object storage targets thereby being implemented within the gateway and storing a plurality of objects with each such object comprising multiple data items of the corresponding one of the storage directories of the network file system cluster;

wherein the storage devices of the first type comprise respective flash storage devices;

wherein the storage directories of the network file system cluster replicate data items of the respective ones of the object storage targets;

wherein the one or more object storage targets are separate from their associated object storage servers;

wherein a data file comprises a set of the data items, and a plurality of data files are collectively stored on the one or more object storage targets under at least one directory distinct from the storage directories of the network file system cluster;

wherein the plurality of data files are allocated from the at least one directory into different groups which are respectively stored in different ones of the storage directories of the network file system cluster;

wherein the gateway and the network file system cluster are configured to support multiple access options for permitting a given client to access one or more of the objects including a first access option in which the one or more objects are accessed via at least one of the object storage servers of the gateway and a second access option in which the given client bypasses the gateway and directly accesses the one or more objects in the network file system cluster; and wherein the network file system cluster further comprises a home directory that is directly accessible by the given client without requiring interaction between the given client and the gateway.

18. The cluster file system of claim 17 wherein the cluster file system comprises a Lustre file system.

19. The cluster file system of claim 17 wherein the portions of the controller are implemented in the gateway.

20. The cluster file system of claim 17 further comprising:

a metadata server; and a metadata target associated with the metadata server;

wherein the network file system cluster further comprises an additional storage directory corresponding to the metadata target; and wherein the controller is further configured to control movement of metadata between the metadata target and the additional storage directory of the network file system cluster.

* * * * *